(12) United States Patent
Khuti et al.

(10) Patent No.: US 8,103,680 B2
(45) Date of Patent: Jan. 24, 2012

(54) SYSTEMS AND METHODS FOR HISTORICAL INFORMATION MANAGEMENT

(75) Inventors: Baz Khuti, Huntsville, AL (US); Robert R. Archibald, St. Louis, MO (US)

(73) Assignees: Missouri Historical Society, St. Louis, MO (US); Emerson Electric, St. Louis, MO (US)

( * ) Notice: Subject to any disclaimer, the term of this patent is extended or adjusted under 35 U.S.C. 154(b) by 490 days.

(21) Appl. No.: 12/383,072

(22) Filed: Mar. 19, 2009

(65) Prior Publication Data
US 2009/0240690 A1   Sep. 24, 2009

Related U.S. Application Data

(60) Provisional application No. 61/070,124, filed on Mar. 20, 2008.

(51) Int. Cl.
*G06F 7/00* (2006.01)
*G06F 17/30* (2006.01)
*G06F 3/00* (2006.01)

(52) U.S. Cl. ........... 707/751; 707/721; 707/768; 725/46
(58) Field of Classification Search ........... 707/721, 707/736, 768; 725/46
See application file for complete search history.

(56) References Cited

U.S. PATENT DOCUMENTS

| | | | |
|---|---|---|---|
| 2003/0009536 A1* | 1/2003 | Henderson et al. | 709/219 |
| 2003/0101449 A1* | 5/2003 | Bentolila et al. | 725/10 |
| 2005/0210507 A1* | 9/2005 | Hawkins et al. | 725/46 |
| 2007/0220103 A1* | 9/2007 | Rogers et al. | 709/217 |
| 2009/0037294 A1* | 2/2009 | Malhotra | 705/27 |
| 2011/0078129 A1* | 3/2011 | Chunilal | 707/706 |

* cited by examiner

*Primary Examiner* — Mohammad Ali
*Assistant Examiner* — Bao Tran
(74) *Attorney, Agent, or Firm* — Bryan Cave LLP

(57) ABSTRACT

A networked computer system is provided for collecting and displaying historical content comprising a plurality of digital objects associated with a historical period or event. The computer system is comprised of one or more networked servers for processing the historical content. The servers are configured to access a database of host historical content input by an operator and user historical content input by a user, and display the historical content. One or more software applications running on the servers facilitate collection, integration and display of historical content. The software applications provide a template accessible to a user via a computer in communication with the network. The template is configured to allow the user to input the user historical content and relate a portion of the host historical content to create a user website integrating the user historical content with a portion of the host historical content.

12 Claims, 4 Drawing Sheets

SYSTEMS AND METHODS FOR HISTORICAL INFORMATION MANAGEMENT

RELATED APPLICATIONS

This application claims priority to, and the benefits of U.S. Provisional Patent Application Ser. No. 61/070,124, filed Mar. 20, 2008. The disclosure of the above application is incorporated herein by reference.

FIELD

The present disclosure relates to systems and methods for information management, and in particular, systems and methods for collecting, integrating and displaying historical information.

BACKGROUND

As technology continues to pervade all aspects of life, museums that have not embraced technology have struggled to remain relevant to the communities they serve. Accordingly, museums are trying to find ways to incorporate technology to enhance the experience for their visitors.

Some museums have turned to technology to meet the needs of a generation that expects to access information through their home computers, store it on their personal computing/memory devices such as MP3 players, and "own" resources in non-traditional ways. For example, visitors to the Library of Congress database online can access multimedia exhibitions, find and download maps, retrieve archival collections information, and view films. Texas Tech University offers the Vietnam Project through a website where veterans are encouraged to access a questionnaire as a prelude to an interview, which, when taped, becomes part of the Virtual Vietnam Archives, where cyber visitors can read a transcript or listen to streaming audio. In the for-profit sector, the History Factory, a heritage management firm, assists corporations, organizations, and institutions discover, preserve, and leverage their history to meet present business challenges. With assistance from the History Factory, organizations can capture the history that gives the organizations their character; uncovering moments of motivation and inspiration that can help define a competitive advantage. The History Factory's products include websites, exhibitions, history books, and integrated anniversary programs.

While much has been done to involve the public with museum work through interactive digital experiences, barriers between personal and public history remain. For example, while technology allows for a delivery system that appeals to the current generation and provides greater opportunities for interaction and choice, the museum still controls the information and the interpretation. Moreover, while visitors can choose items from the collections, they cannot effectively merge their own archival materials with the museum artifacts, nor can they imbed their own exhibition into anything larger. The product that visitors create from museum resources remains static and isolated from the larger work of the museum. Accordingly, museums are seeking to collaborate with their community to collect and incorporate personal narratives that are relevant to the history that the museums seek to preserve. In the media and digital age we now live, moments and events can be captured instantaneously and digitally uploaded to computers and social media sites (such as Facebook or YouTube). The context of the new digital media and how material interrelates and supplements previous historical artifacts provides an opportunity to create museum systems that extend outside the traditional "four" walls.

While the formal facade of a museum and its history of authority can impose barriers to such collaboration, the "virtual" landscape made available through information technology has provided relevance in other contexts. For example, Wikipedia plays an important role in creating an interactive field for the exchange of knowledge, which is generated in a form of conversation rather than "received from on high." While it may lack the authority of well-established encyclopedias such as *Britannica*, Wikipedia still engages the public in an active process of sharing—and assessing—knowledge.

For the foregoing reasons, there is a strong need for museum systems and methods that remove barriers between personal and public history and facilitate seamless interaction between museum visitors, actual museum experiences, personal experiences and online museum experiences. The systems and methods described herein provide these and other advantageous results.

SUMMARY

The present disclosure describes methods and systems to engage the public in a process for personalizing history. It provides system and methods that allow the community to take ownership of a museum, its resources, and its capacities for preserving and sharing communal memory. It allows users to blend personal archives with museum resources to create and share products that capture family history or community history and merge their own personal or family history with the publicly accessible history archives. It also discloses an integrated information technology system that provides access for external users and upgrades internal resources for customer service and business development.

The present disclosure comprises a historical information management system (HIMS) comprising one or more levels such as an access level, an infrastructure level, an applications level, and a museum in a box (MiB) level. The access level can include an interface and the infrastructure level can include one or more information technology elements configured to communicate with the other levels of HIMS. The applications level includes both producer and consumer software and the MiB level includes a platform that integrates the applications, access and infrastructure levels. The MiB level also permits users to merge historical information from the HIMS with personal information.

One aspect of the HIMS provides a system for collecting and displaying historical content comprising a plurality of images, video and audio objects associated with a historical period or event. The system includes one or more network servers for processing the historical content. The system also includes database of host historical content input by an operator and a database of user historical content input by a user, which may be stored on the servers or external storage devices. The servers are configured to access and display the host historical content. At least a portion of the host historical content may be associated with data indicating a historical period or event associated with each separate item of historical content. The system includes one or more software applications running on the servers for facilitating collection, integration and display of historical content. One of the software applications provides a template accessible to a user via a computer in communication with the network. The template is configured to allow the user to input the user historical content and relate a portion of the host historical content to create a user website integrating the user historical content with a portion of the host historical content. The template can also allow the user to input metadata associated with at least a portion of the user historical content. The software can also be configured to permit the user to control access to the user website.

In one version, the historical content has associated metadata, which may be input by the operator in the case of host historical content and input by the user via the template in the case of user historical content. The software applications are configured to translate at least a portion of the metadata associated with the images, video and audio objects into a web services definition language to facilitate the transmission of historical content between software applications. The wrapping of digital media via web services can enable search engines to categorize content by subject, topics and usage, to facilitate retrieval of digital media content. In one version, each of the digital web services can be registered in a directory for consumer applications to reference, to facilitate integration into personal history web sites.

In another version, the software applications are further configured to automatically search for relevant host content related to data input by the user through the template, and to display to the user an indication of the availability of relevant host historical content related to the data input by the user. The user may be permitted to purchase the right to access at least a portion of the relevant host historical content and associate at least a portion of the relevant host historical content with the website.

BRIEF DESCRIPTION OF THE DRAWINGS

The disclosure will be better understood from a reading of the following detailed description, taken in conjunction with the accompanying Figures in the drawings in which.

DETAILED DESCRIPTION

Figure 1:
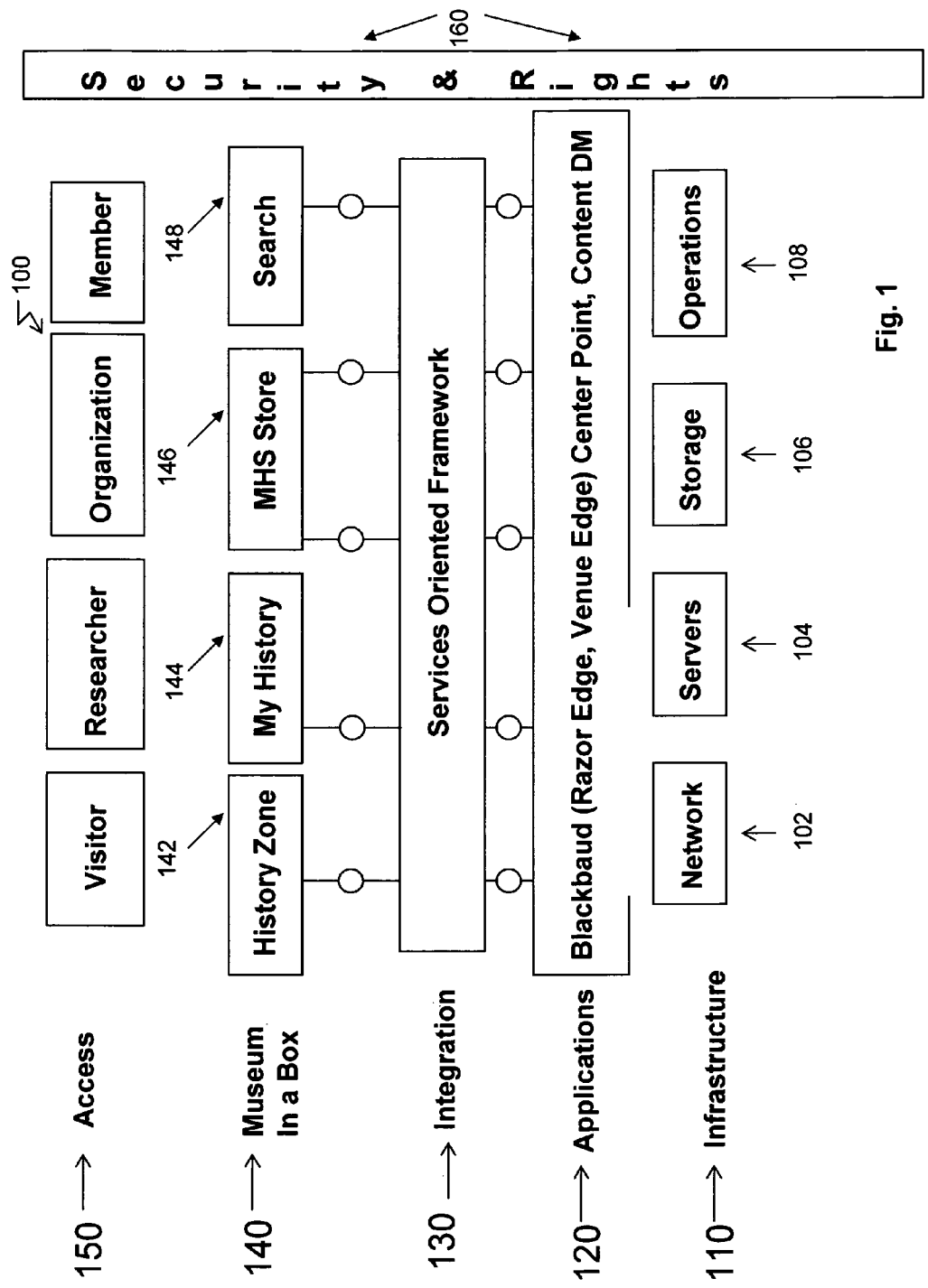
FIG. 1 is a block diagram of an exemplary historical information management system.

FIG. 1 is a block diagram illustrating an exemplary historical information management system (HIMS) 100. HIMS 100 comprises various levels of internal and external software and/or hardware. For example, HIMS 100 comprises an infrastructure level 110 comprising various information technology (IT) elements, an applications level 120 comprising application software to facilitate users and/or operators interaction, an integration level 130 to facilitate communication between front-end and back-end applications, processes, software and hardware, a museum in a box (MiB) level 140 for facilitating one or more producer or consumer applications, an access level 150 for providing one or more interfaces for various users) and/or operators, and a security level 160 to provide encryption, access, data safeguarding and/or the like. While HIMS 100 depicts six different levels, additional levels may be anticipated. In addition, HIMS 100 can be configured to include any combination of these levels as well.

As used herein, the term "user" may be used to refer to any type of individual consumer, customer, researcher and/or the like that receives and/or transmits information from/to HIMS 100. Users include, but are not limited to, visitors, researchers, organizations, members and/or the like. As used herein, the terms "operator" and "host" refer generally to any type of individual, company, group and/or software that program and/or operate any part of HIMS 100. For example, in one exemplary embodiment, an operator is a computer programmer employed by a museum.

Infrastructure 110 comprises traditional information technology elements to facilitate communication, data exchange, data storage, data processing and the like. Infrastructure 110 comprises IT elements, such as, but not limited to servers 104, network 102, operations 108 and/or data storage 106.

Servers 104 can comprise one or more servers and any hardware and/or software suitably configured to facilitate communications between the various system components as discussed herein. Servers 104 can operate as a single entity in a single geographic location or as separate computing components located together or in separate geographic locations. Information received and/or processed at servers 104 may pass through a firewall prior to being received and processed. As used herein, "transmit" may include sending electronic data from one system component to another over a network connection. Additionally, as used herein, "data" may include encompassing information such as commands, queries, files, data for storage, and the like in digital or any other form. Servers 104 may provide a suitable web site or other Internet-based graphical user interface elements accessible users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, ORACLE, SYBASE, INFORMIX MySQL, InterBase, etc., may be used to provide an Active Data Object (ADO) compliant database management system.

Storage 106 comprises one or more devices and/or software systems for storing data in analog or digital format. Storage 106 includes, but is not limited to, magnetic tape, flash drives, RAM, hard drives, databases, optical storage devices, zip drives, and the like. The databases used herein can comprise one or more local, remote or other databases used for information storage and retrieval. The databases can be a graphical, hierarchical, relational, and/or object-oriented database.

Operations 108 comprise any type of software and/or hardware to facilitate communication and data storage within HIMS 100. For example, operations 108 can comprise one and/or more of the following: a host server and/or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. As those skilled in the art will appreciate, operations 108 can include an operating system (e.g., MVS, Windows NT, 95/98/2000/XP, OS2, UNIX, MVS, TPF, Linux, Solaris, MacOS, AIX, etc.) as well as various conventional support software and drivers typically associated with computers.

Network 102 comprises any electronic communications means which incorporates both hardware and software components of such. Network 102 can comprise any suitable communication channels, such as, for example, a telephone network (such as a public switched telephone network or Integrated Services Digital Network (ISDN)), an extranet, an intranet, Internet, point-of-interaction device (personal digital assistant, cellular phone, kiosk, etc.), online communications, off-line communications, wireless communications, transponder communications, local area network (LAN), wide area network (WAN), networked and/or linked devices and/or the like. Moreover, network 102 may also implement TCP/IP communications protocols, IPX, Appletalk, IP-6, NetBIOS, OSI and/or any number of existing and/or future protocols. If network 102 is in the nature of a public network, such as the Internet, various encryption and security protocols may be used to secure network 102. One encryption program that may be used, but is not limited to, is "Blowfish." Specific information related to the protocols, standards, and application software utilized in connection with the Internet is generally known to those skilled in the art and, as such, need not be detailed herein.

The various elements within infrastructure 110, applications 120, integration 130, MiB 140, access 150 and security communicate with one another and/or with other parts of HIMS 100 through a direct connection and/or a network connection.

Applications 120 comprise software and/or hardware to facilitate the management of historical information. For example, applications 120 can comprise accounting applications, ticketing and membership applications, event management applications, retail management applications, prospect development and research applications, digitization applications and/or the like. For example, in one embodiment a fundraising application such as BlackBaud's Raiser's Edge and/or Financial Edge is used. In another embodiment, a ticket management application such as BlackBaud's Patron Edge is used. Other commercial applications that may be used include Center point, Researchers Edge, Prospect Point & WealthPoint, ContentDM by DiMeMa Inc., and/or the like.

As used herein, the term producer application refers to any type of application that shares data between itself and a consumer application. A consumer application, as used herein, refers to any type of application that uses producer application data. Producer and consumer applications are configured to coordinate with one another, for example, the consumer application may be configured so that it does not retrieve data before the producer application has delivered it.

Applications 120 are configured to communicate with one or more external network and/or databases to facilitate historical information management. For example, applications 120 can communicate with WorldCat, a global library network, to transmit and/or receive data from external library resources.

Integration 130 comprises a services oriented framework that is configured to integrate HIMS 100 content with applications 120. Integration 130 is configured to use technologies, such as, for example, Enterprise Application Integration (EAI) technologies, such as Webmethods, Microsoft Biztalk, and/or the like to create an abstraction layer between 'consumer' applications and 'producer' applications described herein. Interaction between these two categories of applications is facilitated by creating reusable web services, such as structured data records that are published to the Web in reusable and remotely queryable formats, such as XML, RDF and microformats. The movement of data between the consumer applications and producer applications can be in a variety of formats known in the art. For example, in one embodiment, data moves between applications in XML message format.

Integration 130 can use any type of software to facilitate integration in the HIMS 100 system. In one exemplary embodiment, integration 130 is configured to use JBoss Enterprise Middleware System (JEMS) Java-based software to provide a message broker, transformation engine and/or adapters to facilitate integration with one or more HIMS 100 databases.

Figure 2:
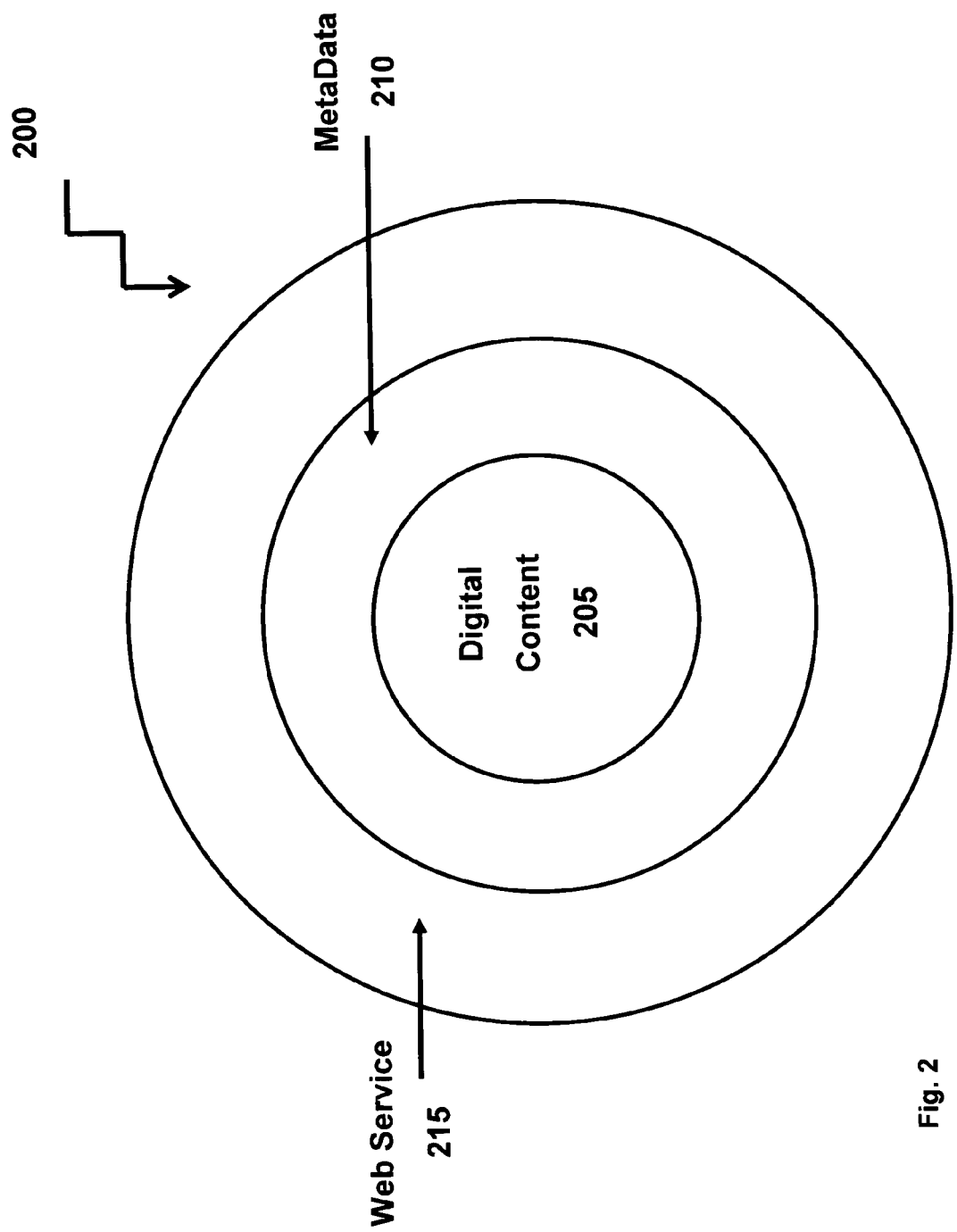
FIG. 2 is a diagram of an exemplary digital content (DC) diagram.

Integration 130 can further be described with reference to an exemplary digital content diagram (DCD) 200, illustrated in FIG. 2. DCD 200 comprises digital content 205 that can be processed, transmitted, communicated and/or the like using JEMS, as described above. DCD 200 comprises a web services layer 215 that is configured to expose the underlying metadata 210 for each digital content 205 within DC 200. Web services layer 215 can be configured to use digital content language standards, such as, for example, Web Services Definition Language (WSDL), to describe digital content 205. Digital content 205 can comprise any type of digital information, including, but not limited to images, video, voice data, and/or the like. Metadata 210 can comprise any information associated with digital content 205. Through web services layer 215, metadata 210 can be accessed or used by any other system or application within HIMS 100. For example, in one exemplary embodiment, integration 130 uses web services layer 215 to associate metadata 210 describing an artifact and its history with an electronic image (digital content 205) of that artifact. Integration 130 can further communicate with one or more applications 120 to facilitate integrating metadata 210, digital content 205 and/or other data from the artifact with other aspects of HIMS 100. The wrapping of digital media via web services can enable search engines to categorize content by subject, topics and usage, to facilitate retrieval of digital media content. In one version, each of the digital web services can be registered in a directory for consumer applications to reference, to facilitate integration into personal history web sites.

MiB 140 can comprise a pre-built set of software, services, taxonomies, metadata, templates, hardware and/or operational components that can be packaged into 'one' offering, which can be configured and/or sold in a software as a service (SAAS) model and/or stand-alone system. MiB 140 comprises one or more user and/or operator applications using structured data provided by the operators and unstructured data provided by the users and/or operators. For example, HIMS operators may provide structured data such as, for example, membership, retail, fundraising, event information and/or the like. Users and/or operators can provide unstructured data, such as, for example text, images, pictures, movies, sound recordings, stories, and/or the like. This unstructured data, as a whole, is considered "content" and can be transmitted, stored, and/or processed by content management software, such as, for example, ContentDM.

Figure 4:
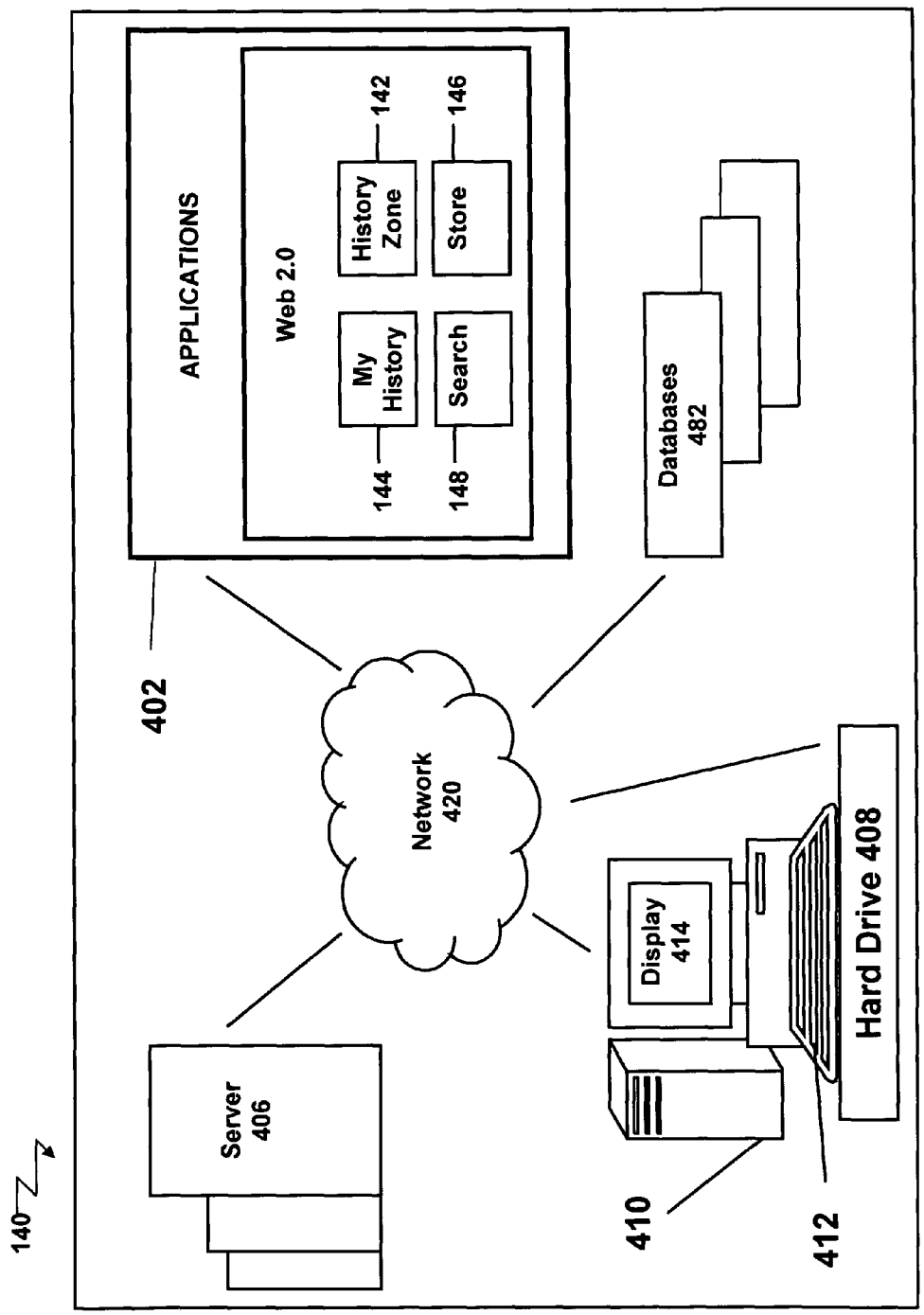
FIG. 4 is a block diagram of an exemplary Museum in a Box system.

FIG. 4 is a block diagram illustrating an embodiment of a MiB 140. MiB 140 comprises a hardware appliance, such as a server 402, with a pre-integrated set of software applications 120, which facilitate the integration of digitized historical content provided by a host (such as a museum) with digital content provided by various system users. For purposes of this example, server 402 is illustrated as a single server, but it may comprise one or more servers.

MiB 140 can comprise various forms of hardware, such as for example, one or more servers, hard-drives, computers, inputs, interfaces and/or network connectivity. In one embodiment, MiB 140 hardware comprises a rack-mounted server (such as, a Dell PowerEdge rackmount server) loaded with an operating system (such as, Red Hat Linux Enterprise) and monitoring software (such as, Dell OpenManage).

Databases 408 are one or more database comprising host historical content input by an operator associated with the host (e.g., a museum) and user historical content input by one or more users. Server 402 may include a storage device 404 in which databases 408 are stored. Alternatively, databases 408 may be stored on another server or external storage device.

In one embodiment, Server 402 is connected to a wide area network such as the internet 412. A user may communicate with Server 402 using a user computer 410 also connected to the internet (as used herein, the term "computer" refers to broadly to any processing device, such as, for example, a PC, laptop, handheld computer, cellular phone, kiosk, etc.). Server 402 may also be connected to a secured host network 420 to other host servers on which other host applications communicating with applications 120 reside. In one embodiment, Server 402 is remotely located from host servers 406 and may communicate with host servers 406 via network 420 or, alternatively, internet 412, or other suitable network configuration.

MiB 140 also can be configured with default software as a service (SAAS) to facilitate HIMS 100 operation "out of the box" with minimal initial configuration required. MiB 140 default functions may also include, for example, access to a standard set of hosted back-end applications, such as, for example BlackBaud and/or the like. In one exemplary embodiment, MiB 140 is configured to provide a subscription to MiB 140 SAAS that is customizable based on the applications desired. For example, MiB 140 can be configured to customize and/or facilitate user customization of one or more back-end applications into a composite application.

MiB 140 can be configured with Web 2.0 technologies as part of applications 120 to facilitate user interaction. For example, MiB 140 can be configured to integrate applications to facilitate Web 2.0 tools such as blogs, wikis, social networks, RSS feeds, mashups, Ajax, podcasts, 3D Internet, virals and/or storytelling, into one interactive environment. These Web 2.0 technologies are defined in the table below.

as other users. For example, the user who created the My History site may limit access to only members of the HIMS community specified by the user. In this way, My History 144 can be used to share information and to create social networks with other users. A My History site can include an online gauge to illustrate the degree of connectedness (for example, in terms of historical interest and knowledge) with other users and communities. My History 144 can also be used to create blogs, wikis, RSS feeds, the creation of online exhibits tied to geographical data (mashups), and to create interactive timelines and user interfaces. In one exemplary embodiment, My History 144 uses Timeline based on MIT's DHTML AJAX widget, available at http://simile.mit.edu/timeline, and incorporated herein by reference.

History Zone 142 is a software application that allows a host (such as a museum) operator to aggregate content (e.g., digital information, images, audio and video) relevant to a certain historical event or period. History Zone 142 can also comprise one or more mash up applications to facilitate linking information and media into a series of interrelated stories created by users. For example, History Zone 142 can comprise a collection of information, images, videos, audio (e.g., podcasts), and other content (some free, others requiring subscription). This content may be related to a particular historical period, historical event, or a current museum event or exhibit. In one version, History Zone 142 is configured to use mash up technologies developed by MIT labs (see, e.g., http://web.media.mit.edu/%7Eedward/EdwardShen_StoriedNavigation.pdf) incorporated herein by reference.

For example, a museum operator could upload a podcast onto server 402. Access layer 150 can be used to facilitate member access to the podcast. History Zone 142 in MiB 140 layer can then be used by the member to facilitate creating and

| Technology | Definitions |
| --- | --- |
| Blogs | Entries by users are shown in order (date, topic, etc.) allowing other users to provide commentary back on the subject, creating a dialogue (or trail) to follow. |
| Wikis | Software that allows the end user to edit and link web pages easily (without software programming knowledge) |
| RSS feeds | Really Simple Syndication-used to publish updated content to the subscriber |
| Mashups | A web application that is a collection of data, information and content from multiple sources into one application. |
| Ajax | Development languages for creating rich web based applications |
| Social networks | Network of communities and groups with common interests which interact and share content to further their knowledge |
| Podcasts | Digital content (video, voice, images) that is created to be shared over the internet and played back by the end user via media players (i.e., MS Media Player). |
| 3D internet | Provides the user with a 3D experience on the Internet, for example, Second Life. |
| Virals | Virals are bite sized content that is spread infectiously around the internet. For HIMS 100 this could represent feeds related to 'This Day In History' or important events provided as content to news agencies. |
| Storytelling | The ability to create, link and construct stories from web content and digital media (such as, for example, videos, images, sound). |

Software applications 120 facilitate interaction between users and the HIMS. In one embodiment, these applications include My History 144, History Zone 142, Search 148 and/or Store 146, which are described in detail below.

My History 144 is a software application that provides a template that allows a user to build a personalized, configurable website for displaying various items of historical information compiled by the user. My History 144 facilitates uploading of historical content (such as, for example, text, images, stories, music, and video) to a websites. The user may be given the option of allowing the website to be accessed by all internet users or restricting access to certain persons, such appending additional material to the podcast to create a revised podcast. The member can use History Zone 142 to save the revised podcast on server 402 for other members to access, revise, and/or transmit.

Store 146 is a software application comprising an eCommerce store for members to purchase HIMS membership, products and digital content. Store 146 can contain advertising and links to retail eCommerce stores (i.e., Amazon.com) as well as links to traditional brick and mortar stores. Store 146 can also be configured to provide up-selling features to the members. Store 146 is further configured to link the products sold in the store to blogs, wikis, museum collections, museum exhibits and/or the like to help members create wish lists, view the products and provide feedback and/or commentary about the product.

Search 148 is a software application configured as a search engine that enables users to search all or part of HIMS 100. Search 148 can also be configured to automatically search for content in History Zone 142, which is potentially of interest to the user based on data input by the user through the My History 144 template. In one embodiment, Search 148 integrates with the Google search engine to facilitate searching for HIMS 100 information. In another embodiment, Search 148 is configured to provide searching across one or more museum collections and/or one or more collections outside of museum (e.g., other museum collections).

MiB 140 may also be configured with one or more customized applications. These customized applications include, for example "Storied Navigation", eCommerce, Museum RSS feeds, and/or the like.

The four MiB applications (My History, History Zones, Store and Search) can be configured to interoperate to provide virtual collaborative experience to the user. As such, these four applications can build on the same technologies and share data, information and content through the use of Web services. This feature can provide agility to new applications and increase user functionality without substantial custom development.

Access layer 150 represents the interaction level between one or more users, operators and/or the like and MiB 140. Access layer 150 comprises one or more interfaces that can be used to facilitate user access to the content residing within MiB 140. Access layer 150 can use any type of interface known in the art, such as, for example, a web browser, a home PC, a user interface within a museum, a mobile device, a personal data assistant, and/or the like. Security layer 160 comprises software and/or hardware to facilitate authentication and authorization of content and digital rights protection and management of content. Security layer 160 is configured to facilitate authentication and/or authorization of content based on the role of the individual seeking to access the content. In one exemplary embodiment, an encrypted directory, such as MS Active Directory, is used to create, access, and/or cross-reference a list of external and/or internal users of HIMS 100 to facilitate authentication and/or authorization of HIMS 100 content.

Security layer 160 is configured to facilitate digital rights protection and management using known software systems, such as, for example, Microsoft DRP or the like, to protect the rights of the originator/copyright holder of the content and/or to minimize illegal and/or mass copying of the content.

Figure 3:
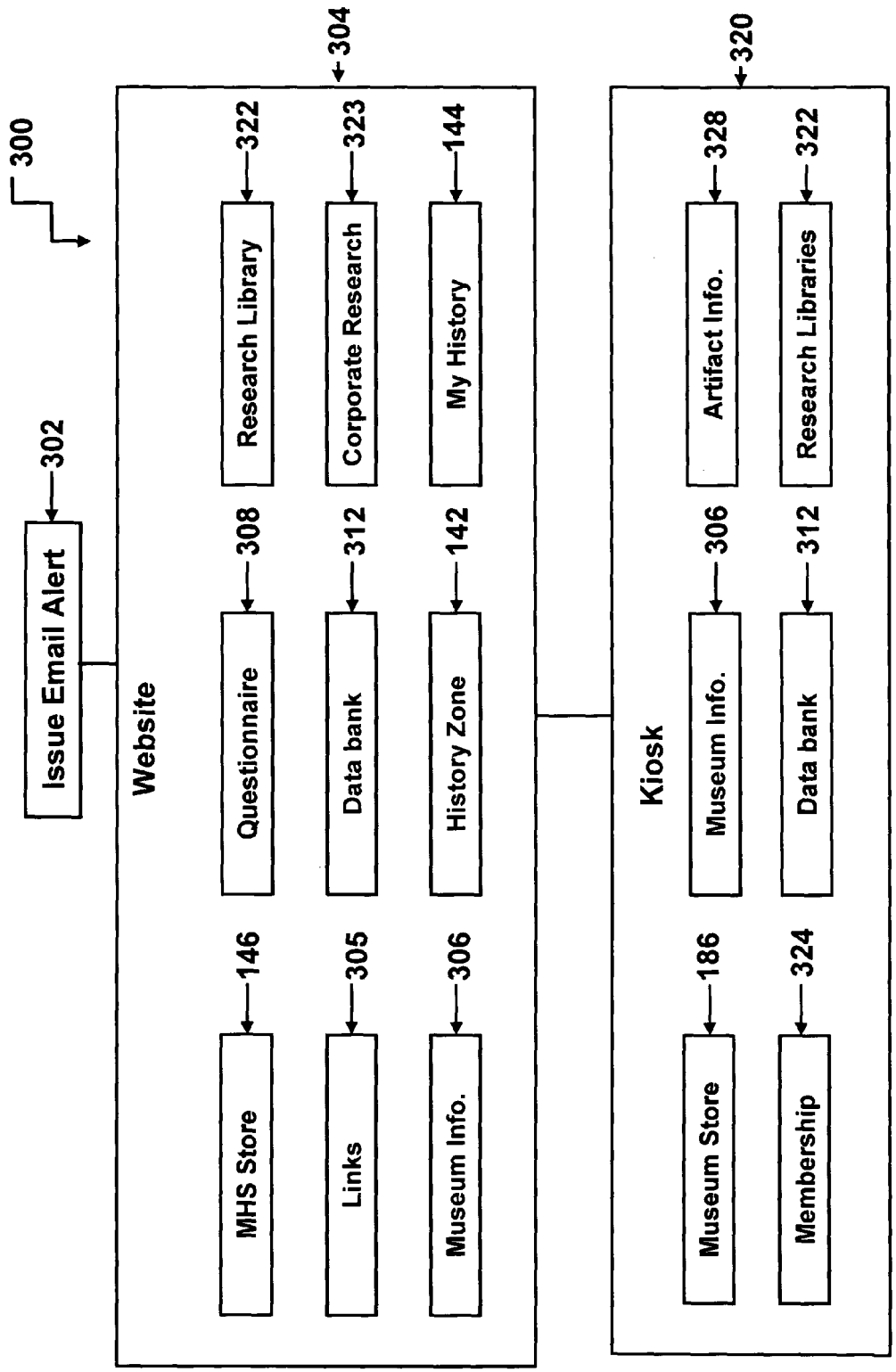
FIG. 3 is a block diagram of an exemplary method of using a historical information management system.

Referring now to FIG. 3, an exemplary method 300 of using HIMS 100 is illustrated. As described herein, HIMS 100 comprises multiple layers that can communicate with one another and perform one or more of the following steps. In addition, the steps recited can occur in any order and are not limited to the order presented herein. HIMS 100 issues an email alert (step 302) to various media outlets, schools, businesses, members and the like. The email alert provides information about the museum and one or more upcoming exhibitions. HIMS 100 can also provide a website (step 304) that provides information to users, and the email can contain one or more links 305 to the website. For example, in one embodiment, a news producer, seeing the alert, links to the website and downloads information about an exhibition (for example, information can be downloaded from History Zone 142) so that a reporter can cover the opening of the exhibit.

HIMS 100 can also provide other content on the website, such as, for example, museum information 306 that can provide interactive maps and/or directions, a questionnaire 308, store 146, research libraries 322, a corporate research link 323, My History 144, History Zone 142 and/or a data bank 312.

Museum information 306 can comprise any type of museum information, such as, for example, membership information, contact information, hours information, exhibit information, admission information, a link to driving directions and/or a map of the museum. For example in one embodiment, museum information 306 comprises a downloadable map and a family guide to the museum exhibition. In yet another exemplary embodiment, museum information 306 includes an interactive direction finder that allows a user to enter in a starting location to provide custom directions to the museum.

In one exemplary embodiment, a user can register with HIMS 100 through museum information 306 and/or My History 144 and save information from questionnaire 308, research libraries 322, Store 146 and/or the like in association with the user's registration information. The user can then access the saved information at any time to update and/or modify the saved information.

Questionnaire 308 comprises one or more questions about the user, the user's family members, the user's interests, the total time at museum and/or the artifacts available at the museum. Questionnaire 308 receives input from a user and generates a personal museum tour for the user. The personal museum tour can include a printable museum map, information about the artifacts on the tour, and/or the like.

Data bank 312 comprises one or more databases and/or servers for storing information relating to histories about artifacts created by the museum operators and/or information about artifacts and/or histories provided by users. Information stored in data bank 312 includes, but is not limited to artifacts, digital images, documents, personal stories, historical information, timelines, maps and/or the like. For example, in one embodiment, a user can search data bank 312 for a particular artifact and/or historical event and enter a personal story related to the artifact and/or historical event. The personal story is then maintained in data bank 312 alongside of other historical information and/or personal stories about the artifact and/or historical event.

In another exemplary embodiment, a user can use data bank 312 to access and order copies of material associated with the artifact and/or event. For example, a user can use data bank 312 to pull together various images, stories, maps, artifacts and/or historical information to create an electronic and/or hard copy scrapbook. The user can also add personal images relating to the artifact and/or historical information to add to the electronic and/or hard copy scrapbook. A hardcopy scrapbook can be made using online scrapbooking technology, such as, for example, SCRAPO and/or the like. An electronic scrapbook may be made by collating digital information, such as described above with respect to My History 144.

HIMS 100 can also provide one or more in-museum kiosks (step 320) for facilitating a user's museum experience. The kiosks can comprise a link to the Internet and/or to one or more online research libraries 322, membership information 324, museum information 306, artifact information 328, Store 146 information, data bank 312 information and/or the like. The kiosks can also be configured with any of the links provided on the website. The kiosks can be configured as a computing device with a keyboard, mouse, and/or other input device as well as a printer and/or other type of output device. The kiosks can also have touch-screen navigation technologies embedded in them to facilitate user interaction.

In one exemplary embodiment, a user who has pre-registered through the website can use the kiosks to locate information associated with the user's registration. For example, a user can use museum information 306 to access a personal tour and print out a new map of the tour using the kiosks.

Research libraries 322 can link to one or more local and/or remote libraries. A user can use the research libraries 322 link at the museum kiosk and/or museum website to perform research on an artifact, event and/or any other aspect. Research libraries 322 can also comprise a corporate research link 323. Corporate research 323 can be used to research information about a company, and a My History or History Zone related to that company or industry could also be created. For example, in one exemplary embodiment, a user uses corporate research 323 to obtain a museum's services in researching the history of her company for the company's twentieth anniversary.

Membership 324 can be used to facilitate membership registration, renewal, comments, tickets, and/or discounts. For example, in one exemplary embodiment, a user uses membership 324 to renew his membership while at the museum and to leave a comment about an exhibit. Membership 324 can also be used to access a discount coupon to the museum restaurant and/or a temporary membership card.

Artifact information 328 can comprise information associated with one or more artifacts in the museum. For example, a user can use a kiosk located next to a photograph in the museum to learn more about the events and people depicted in the photograph. Artifact information 328 can comprise historical information, links, podcasts, images and/or the like that provide information about an artifact.

Exemplary methods and systems can be generally described with respect to the following scenario. These exemplary systems and methods are meant for illustration purposes and can be achieved using one or more technologies as will be described in greater detail herein.

A museum's public information division announces the opening of a new exhibition through an email alert to all the local TV and radio stations; the email links to the museum's website for the immediate download of information. A local news producer, seeing a story, downloads the information and sends a reporter to cover the opening. The local news producer could have a My History site or be a subscriber to a History Zone.

While watching the news, Mrs. Jones sees the coverage and decides that the exhibition is just right for her family, especially with the grandparents coming to town that weekend. Since it has been at least five years since she last visited the museum, she goes to the museum's website, where she finds a link to a downloadable map and a family guide to the museum exhibition as well as a myriad of additional information.

Knowing the family will only have about two hours for their visit including driving time, Mrs. Jones prints the driving directions and takes several minutes more to register at the site, and fill out a simple questionnaire about the family members, their interests, and the artifacts they would most like to see during their visit. She receives a printable, personal museum tour that the family can accomplish in one hour.

On Saturday afternoon, the Jones family heads to the museum. Within two blocks of their approach, they see banners advertising the new exhibition and the excitement mounts. Parking the van, the family enters the museum at the main entrance, where they are greeted in person by a visitor services representative.

Mrs. Jones finds to her chagrin that she has left the personal tour map in the car, but because she had registered on-line (for example, she has a MyHistory site), visitors services can access her personal tour and provide a copy, which has been updated to reflect a last minute change in programming. Armed with the second copy of their personal tour and the knowledge that friendly staff members are there to help, the Joneses begin their tour of the special exhibition.

In exhibition hall, the family discovers kiosks that collect personal stories related to exhibition themes. Grandpa Jones has a story the entire family encourages him to leave. With extra encouragement from a museum docent, Grandpa Jones' personal story becomes part of the larger story (for example, via an entry in their MyHistory site).

At one of the exhibition cases, Cheryl Jones, the teenage daughter, is drawn to an artifact that she wants to know more about. She finds a computer near the case that has information about all of the artifacts on view, along with related documents. Mikey Jones, the youngest family member, spies a model in the exhibition and begins begging for one just like it. Unwilling to promise something she cannot deliver, Mrs. Jones spots a museum assistance touch-screen kiosk with multiple icons, including one for the museum shop. In just a moment, she is relieved to learn that the model is available. Her assurances appease her youngest son for the time being, and the family moves on to the next items on their personal tour. They leave enough time to catch the day's program and visit the shop to get the model for Mikey.

While Mrs. Jones is at the cash register, Grandma Jones decides to use one of the assistance kiosks to renew her membership and leave a comment about exhibits she would like to see next. Before they leave the museum, the Jones family grabs a bite to eat in the restaurant, where Grandma Jones' just-renewed membership provides them with a discount on the meal.

Then the family heads out for the rest of their weekend activities. On Sunday evening, however, as Mrs. Jones is straightening up the dining room before bed, she reaches for the personal tour map from the museum and sees a list of topics related to their tour that can be researched at the Museum's website. Remembering Grandpa's story, Mrs. Jones logs on to the museum website and finds the links to the museum's memory data bank. Here she finds artifacts, photographs and documents all related to the business where Grandpa used to work. She bookmarks the page to return when she has more time.

A few days later, Mrs. Jones returns to her search, and finds she can order copies of the material on line. Because she thinks this would make a great $75^{th}$ birthday present for Grandpa Jones, she decides to visit the museum's Center for History and Community to seek help in creating a gift item. Convenient hours and advertised activities allow Mrs. Jones to visit the Center with her son Mikey. While Mikey is occupied with a project of his own, Mrs. Jones consults with the professionals at the Center and decides to create a family scrapbook using a combination of her own family photographs, and the museum's archives. With goals and ideas in hand from her visit, she realizes she can do much of the work from home.

Mrs. Jones also notices that the Center offers Corporate Research services and she decides to pitch the idea to her boss at the Micro-Shoe company. Her boss notes that the company is having its $20^{th}$ anniversary soon, and decides that a history of the company would make a great gift for shareholders and she contacts the museum for details.

As she puts the finishing touches on her scrapbook, Mrs. Jones decides to donate a number of the photographs to the museum, along with a pedal car Grandpa Jones had used as a kid. The friendliness of the staff and the community access to the collections has convinced Mrs. Jones that the car will have a good home.

Back at the museum, the new exhibition team begins planning for the next exhibitions. They access Grandma Jones' comments and the family's information to put together a focus group. Two years later, when Grandpa Jones' pedal car goes on exhibit at the Museum, the curator is able to contact Mrs. Jones personally to let her know. The museum's public information division sends out alerts to the news and radio stations, and the process begins again.

The foregoing detailed description herein refers to the accompanying drawings, which show exemplary embodiments by way of illustration and best mode. While these exemplary embodiments are described in sufficient detail to enable those skilled in the art to practice the systems and methods described herein, it should be understood that other embodiments can be realized and that logical and mechanical changes can be made. Thus, the detailed description herein is presented for purposes of illustration only and not of limitation.

For the sake of brevity, conventional data networking, application development and other functional aspects of the systems (and components of the individual operating components of the systems) cannot be described in detail herein. Furthermore, the connecting lines shown in the various figures contained herein are intended to represent exemplary functional relationships and/or physical couplings between the various elements. It should be noted that many alternative and/or additional functional relationships and/or physical connections could be present in a practical system.

The present disclosure has been described in terms of functional block components, block diagrams, flow charts, optional selections and various processing steps. It should be appreciated that such functional blocks can be realized by any number of hardware and/or software components configured to perform the specified functions. For example, the system can employ various integrated circuit components (e.g., memory elements, processing elements, logic elements, look-up tables, and the like), which can carry out a variety of functions under the control of one and/or more microprocessors and/or other control devices. Similarly, the software elements can be implemented with any programming and/or scripting language such as C, C++, Java, COBOL, assembler, PERL, Visual Basic, SQL Stored Procedures, extensible markup language (XML), hypertext markup language (HTML), with the various algorithms being implemented with any combination of data structures, objects, processes, routines and/or other programming elements. Further, it should be noted that the system could employ any number of conventional techniques for data transmission, signaling, data processing, network control, and the like.

Moreover, it will be understood that each functional block of the block diagrams and the flowchart illustrations, and combinations of functional blocks in the block diagrams and flowchart illustrations, respectively, can be implemented by computer program instructions. These computer program instructions can be loaded onto a general-purpose computer, special purpose computer, and/or other programmable data processing apparatus to produce a machine, such that the instructions that execute on the computer and/or other programmable data processing apparatus create means for implementing the functions specified in the flowchart block and/or blocks.

These computer program instructions can also be stored in a computer-readable memory that can direct a computer and/or other programmable data processing apparatus to function in a particular manner, such that the instructions stored in the computer-readable memory produce an article of manufacture including instruction means that implement the function specified in the flowchart block and/or blocks. The computer program instructions can also be loaded onto a computer and/or other programmable data processing apparatus to cause a series of operational steps to be performed on the computer and/or other programmable apparatus to produce a computer-implemented process such that the instructions which execute on the computer and/or other programmable apparatus provide steps for implementing the functions specified in the flowchart block and/or blocks.

Accordingly, functional blocks of the block diagrams and flowchart illustrations support combinations of means for performing the specified functions, combinations of steps for performing the specified functions, and program instruction means for performing the specified functions.

As will be appreciated by one of ordinary skill in the art, the systems and methods disclosed herein can be embodied as a method, a data processing system, a device for data processing, and/or a computer program product. Accordingly, the disclosed systems and methods can take the form of an entirely software embodiment, an entirely hardware embodiment, and/or an embodiment combining aspects of both software and hardware. Furthermore, the disclosed systems and methods can take the form of a computer program product on a computer-readable storage medium having computer-readable program code means embodied in the storage medium. Any suitable computer-readable storage medium can be utilized, including hard disks, CD-ROM, optical storage devices, magnetic storage devices, and/or the like.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the systems and methods described herein are, for example, capable of operation in sequences other than those illustrated or otherwise described herein. Furthermore, the terms "comprises," "comprising," "include," "have," and/or any other variation thereof, are intended to cover a non-exclusive inclusion, such that a process, method, article, and/or apparatus that comprises a list of elements does not include only those elements but may include other elements not expressly listed and/or inherent to such process, method, article, and/or apparatus. Further, no element described herein is required unless expressly described as "essential" and/or "critical."

What is claimed is:

1. A system for collecting and displaying historical content comprising a plurality of digital objects associated with a historical period or event, the system comprising:
   one or more servers for processing the historical content, wherein the one or more servers are in communication with a network;
   a database of host historical content input by an operator, wherein the one or more servers are configured to access and display the host historical content;
   a database of user historical content input by a user, wherein the one more servers are configured to access and display the user historical content, wherein at least a portion of the historical content has associated metadata, and wherein one or more software applications are configured to translate at least a portion of the metadata associated with the plurality of digital objects into a web services definition language to facilitate the transmission of historical content between software applications;

one or more software applications running on the one or more servers for facilitating collection, integration and display of historical content, wherein the one or more software applications provides a template accessible to a user via a computer in communication with the network, wherein the template is configured to allow the user to input the user historical content and relate a portion of the host historical content to create a user website integrating the user historical content with a portion of the host historical content and to permit the user to purchase a right to access at least a portion of the relevant host historical content and associate at least a portion of the relevant host historical content with the user website; and wherein the template is further configured to allow the user to input data associated with the historical content and wherein the one or more software applications are further configured to search for relevant host content related to data input by the user through the template, and to display to the user an indication of the availability of relevant host historical content related to the data input by the user.

2. The system of claim 1, wherein the digital objects comprise at least one of images, video and audio objects.

3. The system of claim 1, wherein at least a portion of the host historical content is associated with data indicating a historical period or event associated with each separate item of historical content.

4. The system of claim 1, further comprising one or more host computers located at a host facility remotely located from the one or more servers, wherein the one or more servers communicates with the host computers via the network.

5. The system of claim 1, wherein the software is further configured to permit the user to restrict access to the user website to other specified users designated by the user.

6. A system for collecting and displaying historical content comprising a plurality of images, video and audio objects associated with a historical period or event, the system comprising:

one or more servers for processing the historical content, wherein the one or more servers are in communication with a network;

a database of host historical content input by an operator, wherein at least a portion of the host historical content is associated with data indicating a historical period or event associated with each separate item of historical content, and wherein the one or more servers are configured to access and display the host historical content;

a database of user historical content input by a user, wherein the one more servers are configured to access and display the user historical content;

one or more software applications running on the one or more servers for facilitating collection, integration and display of historical content, wherein the one or more software applications provides a template accessible to a user via a computer in communication with the network, wherein the template is configured to allow the user to input the user historical content and relate a portion of the host historical content to create a user website integrating the user historical content with a portion of the host historical content and to input metadata associated with at least a portion of the user historical content and to permit the user to control access to the user website, and wherein the historical content has associated metadata and wherein one or more software applications are configured to translate at least a portion of the metadata associated with the images, video and audio objects into a web services definition language to facilitate the transmission of historical content between software applications, and wherein the one or more software applications are further configured to automatically search for relevant host content related to data input by the user through the template, and to display to the user an indication of the availability of relevant host historical content related to the data input by the user and to permit the user to purchase a right to access at least a portion of the relevant host historical content and associate at least a portion of the relevant host historical content with the website.

7. A server system comprising one or more servers configured to be connected to a network for collecting and displaying historical content comprising a plurality of digital objects associated with a historical period or event, the server system comprising:

a storage device for storing host historical content input by an operator and user historical content input by a plurality of users, wherein at least a portion of the historical content has associated metadata;

one or more software applications running on the one or more servers for facilitating collection, integration and display of historical content, wherein the one or more software applications are configured to translate at least a portion of the metadata associated with the digital objects into a web services definition language to facilitate the transmission of historical content between software applications and wherein the one or more software applications is configured to permit the user to purchase a right to access at least a portion of the relevant host historical content and associate at least a portion of the relevant host historical content with the website;

wherein the one or more software applications provides a template accessible to each of the plurality of users via a computer in communication with the network, wherein the template is configured to allow each user to input user historical content and relate a portion of the host historical content to the user historical content input by the user to create a user website integrating the input user historical content with a portion of the host historical content, and wherein the template is further configured to allow the user to input data associated with the historical content and wherein the one or more software applications are further configured to search for relevant host content related to data input by the user through the template and to associate at least a portion of the relevant host historical content with the website.

8. The system of claim 7, wherein the digital objects comprise at least one of images, video and audio objects.

9. The system of claim 7, wherein at least a portion of the host historical content is associated with data indicating a historical period or event associated with each separate item of historical content.

10. The system of claim 7, further comprising one or more host computers located at a host facility remotely located from the one or more servers, wherein the one or more servers communicates with the host computers via the network.

11. The system of claim 7, wherein the software is further configured to permit the user to restrict access to the user website to other specified users designated by the user.

12. A server system comprising one or more servers configured to be connected to a network for collecting and displaying historical content comprising a plurality of digital images, video and audio objects associated with a historical period or event, the server system comprising:

a storage device for storing a host historical content input by an operator and user historical content input by a plurality of users, wherein at least a portion of the historical content is associated with metadata indicating a historical period or event associated with each separate item of historical content;

one or more software applications running on the one or more servers for facilitating collection, integration and display of historical content, wherein the one or more software applications provides a template accessible to each of the plurality of users via a computer in communication with the network, wherein the template is configured to allow each user to input user historical content and relate a portion of the host historical content to the user historical content input by the user to create a user website integrating the input user historical content with a portion of the host historical content and to permit the user to permit access to the user website to other designated users;

wherein one or more software applications are configured to translate at least a portion of the metadata associated with the images, video and audio objects into a web services definition language to facilitate the transmission of historical content between software applications;

wherein the template is further configured to allow the user to input data associated with the historical content and wherein the one or more software applications are further configured to automatically search for relevant host content related to data input by the user through the template, and to display to the user an indication of the availability of relevant host historical content related to the data input by the user and to permit the user to purchase a right to access at least a portion of the relevant host historical content and associate at least a portion of the relevant host historical content with the website.

* * * * *